(12) United States Patent
Edlund (10) Patent No.: US 6,858,341 B2
(45) Date of Patent: Feb. 22, 2005

(54) BIPOLAR PLATE ASSEMBLY, FUEL CELL STACKS AND FUEL CELL SYSTEMS INCORPORATING THE SAME

(75) Inventor: David J. Edlund, Bend, OR (US)

(73) Assignee: IdaTech, LLC, Bend, OR (US)

( * ) Notice: Subject to any disclaimer, the term of this patent is extended or adjusted under 35 U.S.C. 154(b) by 149 days.

(21) Appl. No.: 10/153,282

(22) Filed: May 21, 2002

(65) Prior Publication Data

US 2003/0219639 A1 Nov. 27, 2003

(51) Int. Cl.[7] ............................. H01M 8/02; H01M 8/24
(52) U.S. Cl. ....................................................... 429/34
(58) Field of Search ................................ 429/19, 32, 34

(56) References Cited

U.S. PATENT DOCUMENTS

| | | | |
|---|---|---|---|
| 3,765,946 A | 10/1973 | Werner et al. | |
| 3,877,989 A | 4/1975 | Waldman et al. | |

(List continued on next page.)

FOREIGN PATENT DOCUMENTS

| | | | | |
|---|---|---|---|---|
| EP | 1237215 A2 | * | 9/2002 | ............ H01M/8/02 |
| GB | 1037423 | | 5/1963 | |
| JP | 62-287573 | | 12/1987 | |
| JP | 1-93062 | | 4/1989 | |
| JP | 6-52868 | | 2/1994 | |
| WO | WO 00/02282 | | 1/2000 | |

OTHER PUBLICATIONS

English–language abstract of Japanese Patent No. JP 62–287573, 1987.
English–language abstract of Japanese Patent No. JP 1–93062, 1989.
English–language abstract of Japanese Patent No. JP 6–52868, 1998.
English–language abstract of German language PCT patent application Ser. No. WO 97/43796, 1997.
Adris, A. M., et al., "A Fluidized Bed Membrane Reactor for the Steam Reforming of Methane," The Canadian Journal of Chemical Engineering, vol. 69, pp. 1061–1070 (Oct. 1991).
Amphlett, J. C., et al., "On Board Hydrogen Purification for Steam Reformer/PEM Fuel Cell Vehicle Power Plants," Energy Progress X, Proceedings of the 10th World Hydrogen Energy Conference, Cocoa Beach, Florida, U.S.A., vol. 3, pp. 1681–1690 (Jun. 1994).
Freemantle, Michael, "Eyes on Ionic Liquids," Chemical & Engineering News, pp. 37–50 (May 15, 2000).
Jørgensen, S. Lægsgaard, et al., "Application of Pd–Membranes for the Production of Pure Hydrogen in Methanol–Based Fuel Cell Powered Vehicles," Proceedings of Fourth Workshop: Optimisation of Catalytic Membrane Reactor Systems, ESF Network, Catalytic Membrane Reactors, Oslo, Norway, pp. 51–57 (May 30–31, 1997).

*Primary Examiner*—Gregg Cantelmo
(74) *Attorney, Agent, or Firm*—Kolisch Hartwell, P.C.

(57) ABSTRACT

A layered bipolar plate assembly and fuel cell stacks and fuel cell systems incorporating the same. In some embodiments, the bipolar plate assembly includes a structural metal that provides strength to the assembly and a conductive metal that provides favorable electrical conductivity. In some embodiments, the structural metal is diffusion bonded to the conductive metal to decrease the electrical resistance between the structural metal and the conductive metal. A flow field established on the surface of the bipolar plate assembly is present in some embodiments. The flow field may be established by sacrificially etching the conductive metal with an etchant configured to etch the conductive metal while leaving the structural metal at most substantially unetched. Methods for forming the bipolar plate assemblies and fuel cell systems including fuel cell stacks with the bipolar plate assemblies are also disclosed.

39 Claims, 5 Drawing Sheets

U.S. PATENT DOCUMENTS

| | | | |
|---|---|---|---|
| 4,037,025 A | 7/1977 | Dey et al. | |
| 4,096,296 A | 6/1978 | Galmiche et al. | |
| 4,175,165 A | 11/1979 | Adlhart | |
| 4,537,840 A | 8/1985 | Tsukui et al. | |
| 4,578,323 A | 3/1986 | Hertl et al. | |
| 4,583,583 A | 4/1986 | Wittel | |
| 4,684,581 A | 8/1987 | Struthers | |
| 4,689,280 A * | 8/1987 | Gionfriddo | 429/34 |
| 4,708,916 A | 11/1987 | Ogawa et al. | |
| RE33,149 E | 1/1990 | Petrow et al. | |
| 5,252,410 A | 10/1993 | Wilkinson et al. | |
| 5,300,370 A | 4/1994 | Washington et al. | |
| 5,344,721 A | 9/1994 | Sonai et al. | |
| 5,478,662 A | 12/1995 | Strasser | |
| 5,509,942 A | 4/1996 | Dodge | |
| 5,599,638 A | 2/1997 | Surampudi et al. | |
| 5,624,769 A | 4/1997 | Li et al. | |
| 5,741,605 A | 4/1998 | Gillett et al. | |
| 5,821,185 A | 10/1998 | White et al. | |
| 5,846,669 A | 12/1998 | Smotkin et al. | |
| 5,858,314 A | 1/1999 | Hsu et al. | |
| 5,858,567 A * | 1/1999 | Spear et al. | 429/12 |
| 5,861,137 A | 1/1999 | Edlund | |
| RE36,148 E | 3/1999 | Strasser | |
| 5,879,826 A | 3/1999 | Lehman et al. | |
| 5,928,807 A | 7/1999 | Elias | |
| 5,952,119 A | 9/1999 | Wilson | |
| 5,965,054 A | 10/1999 | McEwen et al. | |
| 5,997,594 A | 12/1999 | Edlund et al. | |
| 6,001,499 A | 12/1999 | Grot et al. | |
| 6,022,634 A | 2/2000 | Ramunni et al. | |
| 6,045,933 A * | 4/2000 | Okamoto | 429/17 |
| 6,059,943 A | 5/2000 | Murphy et al. | |
| 6,060,190 A | 5/2000 | Campbell et al. | |
| 6,080,503 A | 6/2000 | Schmid et al. | |
| 6,117,577 A | 9/2000 | Wilson | |
| 6,146,780 A * | 11/2000 | Cisar et al. | 429/34 |
| 6,165,633 A | 12/2000 | Negishi | |
| 6,171,374 B1 | 1/2001 | Barton et al. | |
| 6,221,117 B1 | 4/2001 | Edlund et al. | |
| 6,248,467 B1 | 6/2001 | Wilson et al. | |
| 6,291,091 B1 | 9/2001 | Preischl et al. | |
| 6,649,299 B2 * | 11/2003 | Appleby et al. | 429/40 |

* cited by examiner

Fig. 17

BIPOLAR PLATE ASSEMBLY, FUEL CELL STACKS AND FUEL CELL SYSTEMS INCORPORATING THE SAME

TECHNICAL FIELD

The invention relates generally to fuel cell systems, and more particularly to bipolar plates for fuel cell systems and fuel cell systems incorporating the same.

BACKGROUND OF THE INVENTION

An electrochemical fuel cell is a device that converts fuel and an oxidant to electricity, reaction product, and heat. Fuel cells commonly are configured to convert hydrogen and oxygen into water and electricity. In such fuel cells, the hydrogen is the fuel, the oxygen is the oxidant, and the water is the reaction product.

The amount of electricity produced by a single fuel cell may be supplemented by connecting several fuel cells together. Fuel cells connected together in series are often referred to as a fuel cell stack. Some fuel cell stacks include membrane-electrode assemblies that are separated by electrically conductive bipolar plates that electrically connect a cathode of one fuel cell to an anode of another. The plates also usually provide structural support to adjacent membrane-electrode assemblies. Furthermore, the plates commonly provide fuel and an oxidant to membrane-electrode assemblies while removing water and heat therefrom.

SUMMARY OF THE INVENTION

The present invention is directed to a layered bipolar plate assembly and to fuel cell stacks and fuel cell systems incorporating the same. In some embodiments, the bipolar plate assembly includes a structural metal that provides strength to the assembly and a conductive metal that provides favorable electrical conductivity. In some embodiments, the structural metal is diffusion bonded to the conductive metal to decrease the electrical resistance between the structural metal and the conductive metal. A flow field established on the surface of the bipolar plate assembly is present in some embodiments. The flow field may be established by sacrificially etching the conductive metal with an etchant configured to etch the conductive metal while leaving the structural metal at most substantially unetched. Methods for forming the bipolar plate assemblies and fuel cell systems including fuel cell stacks with the bipolar plate assemblies are also disclosed.

DETAILED DESCRIPTION AND BEST MODE OF THE INVENTION

Figure 1:
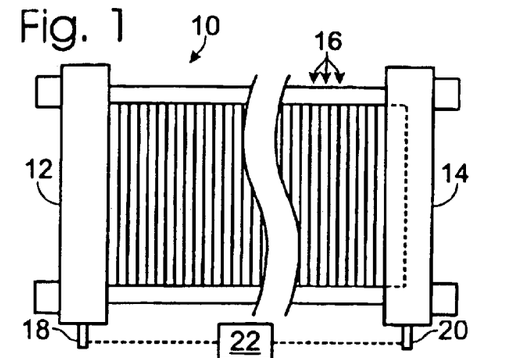
FIG. 1 is a schematic view of a fuel cell stack incorporating a plurality of bipolar plate assemblies according to the present invention.

FIG. 1 schematically depicts a fuel cell stack 10. Stack 10 includes end plates 12 and 14 positioned on opposite ends of the stack. Stack 10 also includes a plurality of fuel cells, or fuel cell assemblies, 16, which are physically arranged between end plates 12 and 14. Each cell is individually configured to convert fuel and an oxidant into an electric current. The fuel cells are electrically coupled in series, although it is within the scope of the invention to couple the cells in parallel or in a combination of series and parallel. When electrically coupled, the cells collectively provide an electric potential dependent on the configuration of the stack. For example, if all cells are electrically coupled in series, the electrical potential provided by the stack is the sum of the cells' respective potentials. Stack 10 is shown with positive contact 18 and negative contact 20, across which a load 22 may be electrically coupled. It should be understood that contacts 18 and 20 have been schematically depicted in FIG. 1 and may be accessible from a variety of locations. Similarly, the number of fuel cells 16 in any particular stack may vary, such as depending upon the desired power output of the fuel cell stack.

Figure 2:
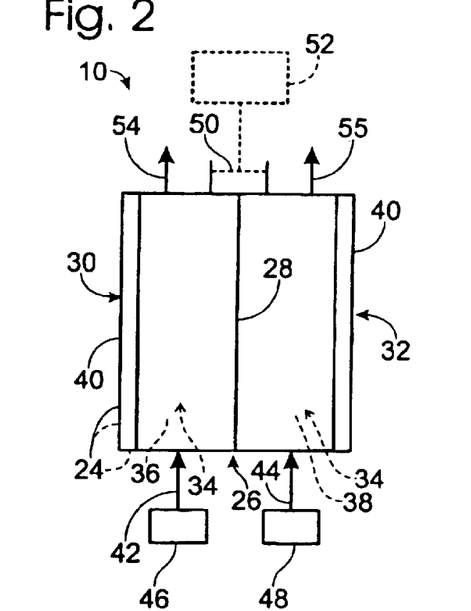
FIG. 2 is a schematic view of a proton exchange membrane fuel cell.

The subsequently discussed bipolar plates, or bipolar plate assemblies, constructed according to the present invention are compatible with a variety of different types of fuel cells, such as proton exchange membrane (PEM) fuel cells, as well as alkaline fuel cells, phosphoric acid fuel cells, and other fuel cells that utilize bipolar plate assemblies. For the purpose of illustration, an exemplary fuel cell 16 in the form of a PEM fuel cell is schematically illustrated in FIG. 2 and generally indicated at 24. Proton exchange membrane fuel cells typically utilize a membrane-electrode assembly 26 consisting of an ion exchange, or electrolytic, membrane 28 located between an anode region 30 and a cathode region 32. Each region 30 and 32 includes an electrode 34, namely an anode 36 and a cathode 38, respectively. Each region 30 and 32 also includes a supporting plate 40, such as at least a portion of the bipolar plate assemblies that are discussed in more detail herein.

In operation, hydrogen 42 is fed to the anode region, while oxygen 44 is fed to the cathode region. Hydrogen 42 and oxygen 44 may be delivered to the respective regions of the fuel cell via any suitable mechanism from sources 46 and 48. Examples of suitable sources 46 for hydrogen 42 include a pressurized tank, hydride bed or other suitable hydrogen storage device, and/or a fuel processor that produces a stream containing hydrogen gas. Examples of suitable sources 48 of oxygen 44 include a pressurized tank of oxygen or air, or a fan, compressor, blower or other device for directing air to the cathode region. Hydrogen and oxygen typically combine with one another via an oxidation-reduction reaction. Although membrane 28 restricts the passage of a hydrogen molecule, it will permit a hydrogen ion (proton) to pass therethrough, largely due to the ionic conductivity of the membrane. The free energy of the oxidation-reduction reaction drives the proton from the hydrogen gas through the ion exchange membrane. As membrane 28 also tends not to be electrically conductive, an external circuit 50 is the lowest energy path for the remaining electron, and is schematically illustrated in FIG. 2. In practice, a fuel cell stack contains a plurality of fuel cells with bipolar plate assemblies, as will be discussed in more detail subsequently, separating adjacent membrane-electrode assemblies. The bipolar plate assemblies essentially permit the free electron to pass from the anode region of a first cell to the cathode region of the adjacent cell via the bipolar plate assembly, thereby establishing an electrical potential through the stack that may be used to satisfy an applied load. This net flow of electrons produces an electric current that may be used to satisfy an applied load. At least one energy-consuming device 52 may be electrically coupled to the fuel cell, or more typically, the fuel cell stack. Device 52 applies a load to the cell/stack and draws an electric current therefrom to satisfy the load. Illustrative examples of devices 52 include motor vehicles, recreational vehicles, boats and other seacraft, tools, lights and lighting assemblies, signaling and communications equipment, batteries and even the balance-of-plant electrical requirements for the fuel cell system of which stack 10 forms a part.

In cathode region 32, electrons from the external circuit and protons from the membrane combine with oxygen to produce water and heat. Also shown in FIG. 2 are an anode purge stream 54, which may contain hydrogen gas, and a cathode air exhaust stream 55, which is typically at least partially, if not substantially, depleted of oxygen. It should be understood that fuel cell stack 10 will typically have a common hydrogen (or other reactant) feed, air intake, and stack purge and exhaust streams, and accordingly will include suitable fluid conduits to deliver the associated streams to, and collect the streams from, the individual cells.

Figure 3:
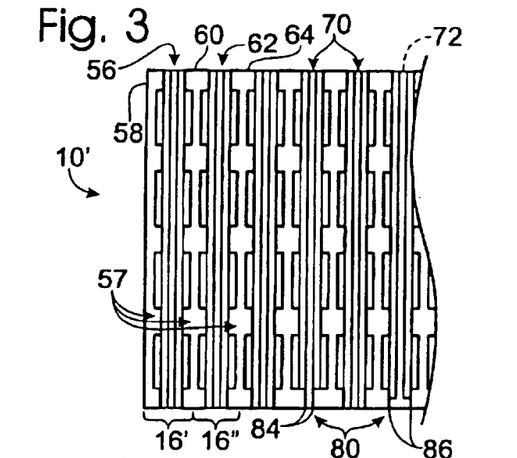
FIG. 3 is a schematic fragmentary view of a plurality of fuel cells, as may be used in fuel cell stacks according to the present invention.

FIG. 3 shows a schematic representation of a fragmentary portion 10' of fuel cell stack 10. As shown, portion 10' includes a plurality of fuel cell assemblies, including fuel cell assemblies 16' and 16". Fuel cell assembly 16' includes a membrane-electrode assembly (MEA) 56 positioned between a pair of bipolar plate assemblies 57, such as assemblies 58 and 60. Similarly, fuel cell assembly 16" includes an MEA 62 positioned between a pair of bipolar plate assemblies 57, such as bipolar plate assemblies 60 and 64. Therefore, bipolar plate assembly 60 is operatively interposed between adjacently situated MEAs 56 and 62. Additional fuel cells may be serially connected in similar fashion, wherein a bipolar plate may be operatively interposed between adjacent MEAs. The phrase "working cell" is used herein to describe fuel cells, such as cells 16' and 16", that are configured to produce electric current and typically include an MEA positioned between bipolar plate assemblies.

Figure 4:
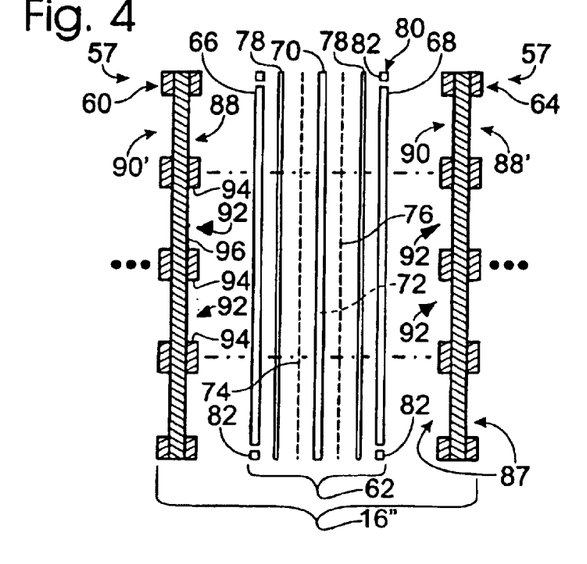
FIG. 4 is an exploded schematic view of a fuel cell, as may be used in fuel cell stacks according to the present invention.

FIG. 4 shows an exploded schematic view of fuel cell assembly 16", which as discussed includes a membrane-electrode assembly (MEA) 62 positioned between bipolar plate assemblies 60 and 64. MEA 62 includes an anode 66, a cathode 68, and an electron barrier 70 that is positioned therebetween. Electron barrier 70 may include any suitable structure and/or composition that enables protons to pass therethrough and yet retards the passage of electrons to bias the electrons to an external circuit. As an illustrative example, barrier 70 may include a membrane-supported electrolyte that is capable of blocking electrons, while allowing protons to pass. For example, in PEM fuel cells, electron barrier 70 may be a polymer membrane 72 configured to conduct hydrogen cations (protons) and inhibit electron flow, and as such may also be described as an ion exchange membrane. In an alkaline fuel cell, electron barrier 70 may be an aqueous alkaline solution or membrane. For phosphoric acid fuel cells, electron barrier 70 may be a phosphoric acid solution (neat or diluted) or membrane.

For at least PEM fuel cells, the electrodes, such as anode 66 and cathode 68, may be constructed of a porous, electrically conductive material such as carbon fiber paper, carbon fiber cloth, or other suitable materials. Catalysts 74 and 76 are schematically depicted as being disposed between the electrodes and the electron barrier. Such catalysts facilitate electrochemical activity and are typically embedded into barrier 70, such as into membrane 72. Cell 16" will typically also include a gas diffusion layer 78 between the electrodes and catalysts 74 and 76. For example, layer 78 may be formed on the surface of the electrodes and/or the catalysts and may be formed from a suitable gas diffusing material, such as a thin film of powdered carbon. Layer 78 is typically treated to be hydrophobic to resist the coating of the gas diffusion layers by water present in the anode and cathode regions, which may prevent gas from flowing therethrough. It should be understood that it is desirable to have a fluid seal between adjacent bipolar plate assemblies. As such, a variety of sealing materials or sealing mechanisms 80 may be used at or near the perimeters of the bipolar plate assemblies. An example of a suitable sealing mechanism 80 is a gasket 82 that extends between the outer perimeters of the bipolar plate assemblies and barrier 70. Other illustrative examples of suitable sealing mechanisms 80 are schematically illustrated in the lower portion of FIG. 3 and include bipolar plate assemblies with projecting flanges 84, which extend into contact with barrier 70, and/or a barrier 70 with projecting flanges 86 that extend into contact with the bipolar plate assemblies. In some embodiments, it may be desirable for the cells to include a compressible region between adjacent bipolar plate assemblies, with gaskets 82 and membranes 72 being examples of suitable compressible regions that permit the cells, and thus the stack, to be more tolerant and able to withstand external forces applied thereto.

As shown in FIG. 4, bipolar plate assemblies 60 and 64 extend along opposite sides of MEA 62 so as to provide structural support to the MEA. Such an arrangement also allows the bipolar plate assemblies to provide a current path between adjacently situated MEAs. Bipolar plate assemblies 60 and 64 are shown with flow fields 87, namely anode flow fields 88 and cathode flow fields 90. Flow field 88 is configured to transport fuel, such as hydrogen, to the anode. Similarly, flow field 90 is configured to transport oxidant, such as oxygen, to the cathode and to remove water and heat therefrom. The flow fields also provide conduits through which the exhaust or purge streams may be withdrawn from the fuel cell assemblies. The flow fields typically include one or more channels 92 that are at least partially defined by opposing sidewalls 94 and a bottom, or lower surface, 96. It should be understood that flow fields 88 and 90 have been schematically illustrated in FIG. 4 and may have a variety of shapes and configurations. Similarly, the channels 92 in a given flow field may be continuous, discontinuous, or may contain a mix of continuous and discontinuous channels. Examples of a variety of flow field configurations are shown in U.S. Pat. Nos. 4,214,969, 5,300,370, and 5,879,826, the complete disclosures of which are herein incorporated by reference for all purposes.

As also shown in FIG. 4, the bipolar plate assemblies may include both anode and cathode flow fields, with the flow fields being generally opposed to each other on opposite faces of the bipolar plate assemblies. This construction enables a single bipolar plate assembly 57 to provide structural support and contain the flow fields for a pair of adjacent MEAs. For example, as illustrated in FIG. 4, bipolar plate assembly 60 includes anode flow field 88 and a cathode flow field 90', and bipolar plate assembly 64 includes cathode flow field 90 and an anode flow field 88'. Although many, if not most or even all of the bipolar plate assemblies within a stack will have the same or a similar construction and application, it is within the scope of the invention that not every bipolar plate assembly within stack 10 contains the same structure, supports a pair of MEAs or contains oppositely facing flow fields.

Figure 5:
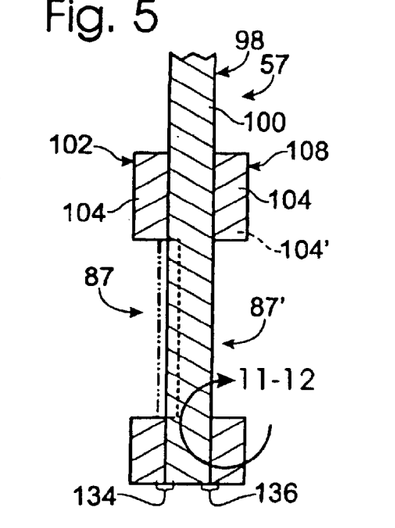
FIG. 5 is a schematic fragmentary view of a portion of a bipolar plate assembly configured for use in fuel cell stacks according to the present invention.

FIG. 5 shows a schematic cross section of a bipolar plate assembly 57 constructed according to the present invention. As shown, bipolar plate assembly 57 includes a structural layer 98 of a structural metal 100. As used herein, the term "metal" is meant to include a pure metal, substantially pure metal, metal alloy, and/or a hybrid combination of at least two of the preceding. Structural metal 100 typically is selected from metals with high strength-to-weight ratios. An example of a suitable structural metal 100 is titanium, although it is within the scope of the invention to use titanium alloys, vanadium, vanadium alloys, or other metals that are relatively light and strong and which preferably are stable (unreactive) within the operating parameters and environments encountered in fuel cell stack 10. Metals with a high strength-to-weight ratio are selected to increase the strength of the fuel cells while keeping the weight relatively low and the size of the fuel cell relatively small compared to cells that utilize structural metals with lower strength-to-weight ratios. These metals may additionally or alternatively be described as providing an equivalent strength, or structural support, to the cells while having a comparatively lower weight than plates formed from materials, such as stainless steel or even aluminum, with lower strength-to-weight ratios. Titanium is particularly well suited because of its favorable combination of high strength and light weight. The thickness of structural layer 98 is selected according to a particular desired application. Thinner structural layers 98 result in relatively lighter and smaller fuel cell stacks compared to similarly configured stacks utilizing thicker structural layers of the same structural metal. Thicker structural layers 98 result in fuel cell stacks with more structural integrity than similarly configured stacks utilizing thinner structural layers of the same structural metal. It has been found that a thickness between 0.01 and 0.1 inches is suitable for most applications when titanium is selected as structural metal 100. However, a structural layer thickness of less than 0.01 inches is within the scope of the invention, as is a structural layer with a thickness that is selected to be greater than 0.1 inches, such as when increased strength is desired.

Bipolar plate assembly 57 also includes a conductive layer 102 of a conductive metal 104. Conductive metal 104 typically is selected from metals with low electrical contact resistances to facilitate an efficient current path between adjacent MEAs. In particular, conductive metal 104 typically has a lower electrical contact resistance than structural metal 100, and although not required, also typically has a lower relative strength-to-weight ratio. An example of a suitable conductive metal 104 is stainless steel, although it is within the scope of the invention to use other metals with good electrical conducting properties. Stainless steel is particularly well suited because of its favorable properties as an electrical conductor and its ability to avoid forming oxide layers that may decrease surface conductivity. The thickness of conductive layer 102 is selected according to a particular desired application. Thinner conductive layers result in relatively lighter and smaller fuel cell stacks compared to similarly configured fuel cell stacks utilizing thicker conductive layers of the same conductive metal. As described below, in many configurations the thickness of the conductive layer determines the depth of the flow field, and therefore is selected to achieve a desired flow field depth. It has been found that a thickness between 0.01 and 0.1 inches is suitable for most applications when stainless steel is selected as conductive metal 104. However, a conductive layer thickness of less than 0.01 inches is within the scope of the invention, as is a conductive layer with a thickness that is selected to be greater than 0.1 inches, such as when a deeper flow field is desired.

In FIG. 5, a flow field 87 is schematically illustrated extending into conductive layer 102 of bipolar plate assembly 57. For example, depending upon the construction and orientation of the fuel cell stack in which plate assembly 57 is used, flow field 87 may be an anode flow field, a cathode flow field, or as discussed in more detail herein, the flow field may form a portion of a cooling assembly, or cooling unit. Although a variety of mechanisms, including stamping and coining, may be used to form flow field 87 within the scope of the invention, a particularly well-suited method is to chemically, or sacrificially, etch the flow field into the conductive layer. The arrangement, pattern, locations of ingress and egress, and other aspects of the flow field are highly customizable, and may be adapted to a particular application. It should be understood that the bipolar plate assemblies, flow fields, MEAs, and other aspects of the fuel cell stack are schematically depicted herein for purpose of illustration. For example, in the illustrated embodiment, flow field 87 extends completely through conductive layer 102 but does not extend into structural layer 98. It is also within the scope of the invention that the flow field may not extend completely through the conductive layer and that the flow field may extend partially into the structural layer, such as indicated in dash-dot and dashed lines in FIG. 5.

In FIG. 5, bipolar plate assembly 57 also includes a second conductive layer 108, although second conductive layer 108 may not be necessary for certain applications. When present, second conductive layer 108 typically is made of conductive metal 104, although it is within the scope of the invention that a different metal may be used, as indicated in dashed lines at 104'. The metal selected for layer 108 typically has a relatively low electrical contact resistance compared to structural metal 100. In other words, conductive metal 104 preferably has a lower electrical contact resistance than structural metal 100. For example, many stainless steels, such as Type 304, 310 and 316 stainless steels have a lower electrical contact resistance than titanium. When conductive layers are mounted on the opposing sides, or faces, of the structural layer, the structural layer may be described as being a structural core.

Figure 6:
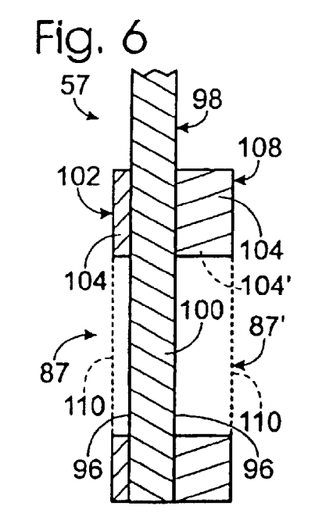
FIG. 6 is a schematic fragmentary view of a portion of another bipolar plate assembly configured for use in fuel cell stacks according to the present invention.
Figure 7:
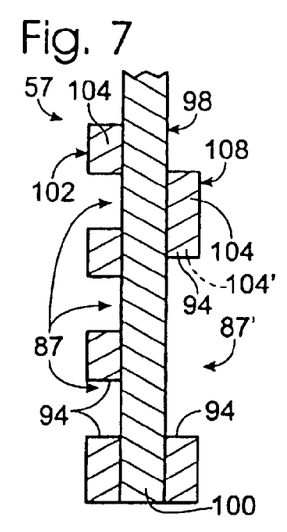
FIG. 7 is a schematic fragmentary view of a portion of another bipolar plate assembly configured for use in fuel cell stacks according to the present invention.

As also shown in FIG. 5, a second flow field 87' is set within the second conductive layer, such as by being chemically etched, stamped, coined, or otherwise configured to extend into the second conductive layer. As shown, the flow field 87' has the same configuration as flow field 87. It is within the scope of the invention, that flow fields 87 and 87' may have essentially the same configuration, with differences largely being due to variances induced by the mechanism by which the flow fields are created, or that the flow fields may have different configurations, such as with one of flow fields 87 and 87' having a greater or smaller depth, width, continuity, or number of channels per side. Examples of bipolar plate assemblies 57 with these configurations are schematically illustrated in FIGS. 6 and 7. In FIG. 6, the channels forming flow fields 87 and 87' have different depths, as measured between bottom 96 and the corresponding inlets 110 to the channels. In FIG. 7, flow fields 87 and 87' have different widths, as measured between opposed sidewalls 94.

Figure 8:
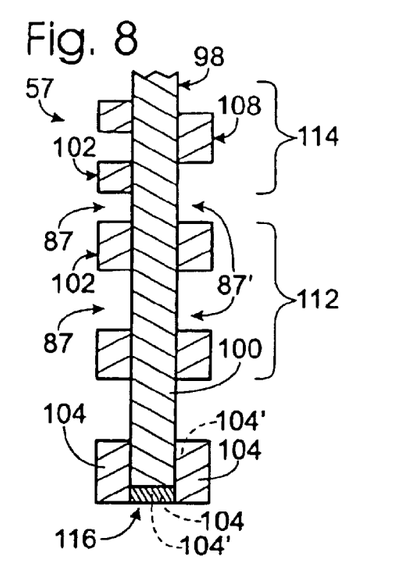
FIG. 8 is a schematic fragmentary view of a portion of another bipolar plate assembly configured for use in fuel cell stacks according to the present invention.

As still another option, flow fields 87 and 87' may each include at least one region 112 that is symmetrical with the corresponding region of the other flow field, and at least one region 114 that is not symmetrical with each other, such as schematically illustrated in FIG. 8. FIG. 8 also provides a graphical illustration of the fact that the bipolar plate assemblies 57 that include opposed conductive layers 102 and 108 that extend on both sides of a structural layer 98 may, but are not required to, further include a bridge, or electrically conductive linkage, or interconnect, 116 that extends between the conductive layers and is formed from a material other than structural metal 100. For example, linkage 116 may extend along at least a portion, spaced-apart portions, or the entirety, of the perimeter of the layers, or at any other suitable location. When present, linkage 116 will typically be formed from one of the electrically conductive metals 104 and 104', although others may be used. It should be understood that any of the exemplary flow field configurations described and/or illustrated above may include flow fields that extend into the corresponding conductive layer, through the corresponding conductive layer but not into the structural layer, or through the corresponding conductive layer and into the structural layer, such as described with respect to FIG. 5.

When the flow fields on each plate have the same or approximately the same configuration, the plates will have symmetry between the opposing sides of structural layer 98 and in some embodiments may be able to be assembled into fuel cell stacks without requiring side-specific references. By this it is meant that a particular side of the plate assembly may be used to support either a cathode or an anode electrode, depending upon the orientation of the plate assembly relative to the MEAs supported by the plate assembly. Alternatively, in some embodiments, it may be desirable for the flow fields to have different configurations, such as to provide for different flow patterns or cross-sectional areas between the anode-facing flow field and the cathode-facing flow field. For example, flow field 87 may be adapted to deliver hydrogen fuel to an anode, while flow field 87' may be adapted to deliver oxygen to a cathode while removing water therefrom. As used herein, a side of a bipolar plate assembly that extends into, or bounds, the anode region of a fuel cell may be referred to as an anode-side plate, or an anode-interfacing portion of the bipolar plate assembly. Similarly, the side of a bipolar plate assembly that extends into, or bounds, the cathode region of a fuel cell may be referred to as a cathode side plate, or a cathode-interfacing portion of the bipolar plate assembly. Similarly, the conductive layers from which the flow fields are formed may respectively be referred to as anode-interfacing and cathode-interfacing layers.

Figure 9:
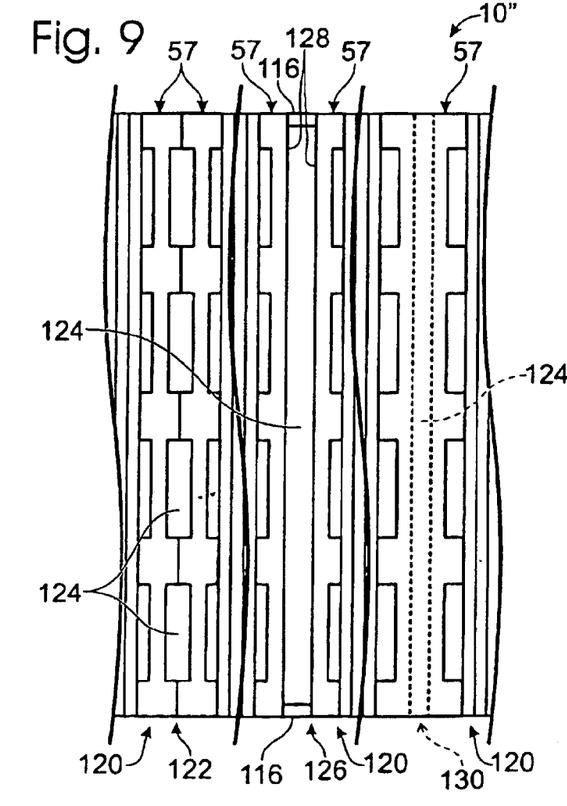
FIG. 9 is a schematic fragmentary view of illustrative coolant units, as may be used in fuel cell stacks according to the present invention.

Operation of fuel cell stack 10 may increase the temperature of the stack. The increased temperature may have a negative effect on stack operation and/or contribute to other undesirable conditions. It has been found that removing excess heat from fuel cell stack 10 may improve the performance and increase the reliability of the stack. Heat may be removed from the stack via cooling assemblies 120, which are adapted to deliver a heat exchange fluid into thermal communication with the stack, whereby the fluid may remove heat from the stack, or alternatively add heat to the stack. Illustrative examples of cooling assemblies 120 are shown in FIG. 9. As the conduits may be utilized, in at least some embodiments, to provide heat to stack 10, such as to thaw a frozen stack, the cooling assemblies may also be referred to as heat transfer conduits.

FIG. 9 shows a schematic representation of a fragmentary portion 10" of fuel cell stack 10, with several illustrative examples of cooling assemblies 120 shown for purposes of illustration. At 122, a pair of bipolar plate assemblies 57 are positioned similar to their expected position for a working cell, however, no membrane-electrode assembly extends between the bipolar plate assemblies. Instead, the plates abut and the flow fields of the plates define conduits 124 through which a heat exchange fluid may be passed to selectively increase or decrease the temperature of the bipolar plate assemblies (and often adjacent structures). Examples of suitable heat exchange fluids include various gases and liquids, including air, water, oil, and glycols. The heat exchange fluid is typically pumped or otherwise propelled through the conduits by a suitable delivery system. The flow rate of the heat exchange fluid may be selectively controlled so that the heat exchange fluid has time to efficiently absorb or deliver heat without becoming effectively saturated with or depleted of heat.

Although schematically depicted as the same size as the flow field channels in FIG. 9, it is within the scope of the invention that the bipolar plate assemblies may be configured so that conduits 124 are selectively larger or smaller than the flow field channels used in working cells. As an additional example, it may be desirable to use a different flow field configuration for conduits 124, such as to select the path along which the heat exchange fluid will travel as its temperature is selectively increased or decreased.

In FIG. 9, further examples of bipolar plate assemblies 57 are shown. As shown at 126, the plate assembly includes opposing faces 128 that define a conduit 124 extending along at least a substantial portion, if not all or approximately all, of the surfaces of the faces. Although faces 128 are spaced-apart from each other, the plate assemblies remain in electrical communication by linkages 116. A further example of a suitable cooling assembly 120 is generally indicated at 130 in FIG. 9. As shown, bipolar plate assembly 57 includes at least one conduit 124 extending through the plate assembly, such as through its structural layer. Conduit 124 may extend in a linear and/or a nonlinear path, and cooling assembly 120 may include more than one conduit 124 extending through a single bipolar plate assembly. Similarly, when fuel cell stack 10 includes a cooling assembly 120, it may include one or more different types of cooling assemblies. Furthermore, the frequency and positioning of the cooling assemblies may vary within the stack, such as between each working cell, between every other working cell, or periodically or irregularly spaced amongst the working cells. It is within the scope of the invention to use other mechanisms to cool fuel cell stack 10, such as those shown in U.S. Pat. Nos. 4,583,583 and 5,879,826, the complete disclosures of which are herein incorporated by reference for all purposes.

Figure 10:
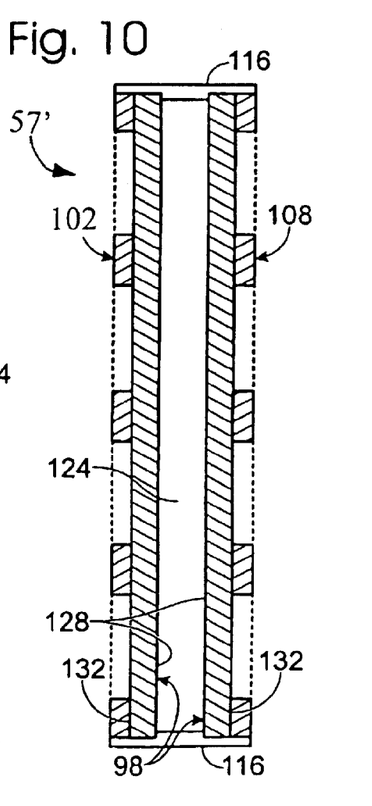
FIG. 10 is a schematic cross section view of another bipolar plate assembly configured for use in fuel cell stacks according to the present invention.

Although primarily described and illustrated herein as including a monolithic structural layer 98 having opposing faces that are sandwiched between a pair of conductive layers 102 and 108, bipolar plate assemblies according to the present invention may include a pair of discrete, or even spaced-apart structural layers 98, such as shown in FIG. 10 in, which the bipolar plate assembly is generally indicated at 57'. As shown, each structural layer forming bipolar plate assembly 57' includes a face 132 upon which a conductive layer 102 is mounted, and the structural and/or conductive layers are in electrical communication via an interconnect, or linkage 116. In the illustrated embodiment, interconnect, or linkage(s) 116 may include any suitable structure for conducting charge between an anode region of a first working cell and a cathode region of a second working cell. The bipolar plate assembly shown in FIG. 10 may be configured the same as the previously described bipolar plate assemblies, and as such may include any of the elements, subelements, materials of construction and/or variations discussed above. The region between the internal faces 128 of the structural layers may be at least partially filled with a metal or other material or materials and/or hollow, such as to provide one or more conduits 124 for cooling assemblies 120.

Fuel cell stack 10 may include virtually any number of working cells and cooling assemblies. The stack is capable of outputting relatively more electric current as additional working cells are added to the stack. Similarly, the stack may dissipate relatively more heat as more cooling assemblies are added. At the same time, the stack can be made relatively smaller and lighter when fewer working cells and/or cooling assemblies are used. The optimum compromise of size, weight, energy output, and operating temperature may vary depending on the desired application. As explained herein, it is within the scope of the invention to design a fuel cell system for various applications, such as by selectively choosing the number and arrangement of working cells compared to cooling assemblies and/or the materials used to construct the bipolar plate assemblies.

Figure 11:
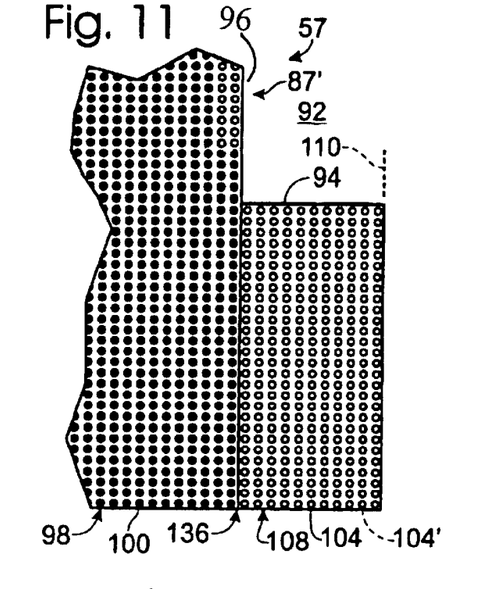
FIG. 11 is a schematic microscopic view of a portion of an unclad bipolar plate assembly constructed according to the present invention.

As discussed, bipolar plate assemblies 57 according to the present invention include a structural layer 98 upon which one or more conductive layers 102 and/or 108 are mounted. For example, and as shown by referring back to FIG. 5, structural layer 98 is shown abutting conductive layer 102 at a first transitional region 134, and conductive layer 108 abuts structural layer 98 at a second transitional region 136. When the layers are physically mounted against each other, such as being plated, adhered, welded or otherwise physically or mechanically secured together, the transitional regions comprise the interface between the abutting surfaces of the layers, at which the composition of the bipolar plate assembly abruptly changes between structural metal 100 and conductive metal 104 (and/or 104'). An example of such a configuration is shown in FIG. 11. As shown, structural metal 100 is schematically illustrated with black dots, and conductive metal 104 (or 104') is schematically illustrated with white dots. To provide an additional graphical illustration of the fact that the flow fields of bipolar plate assemblies according to the present invention may extend completely or partially through the corresponding conductive layers, FIG. 11 illustrates each of these examples.

Figure 12:
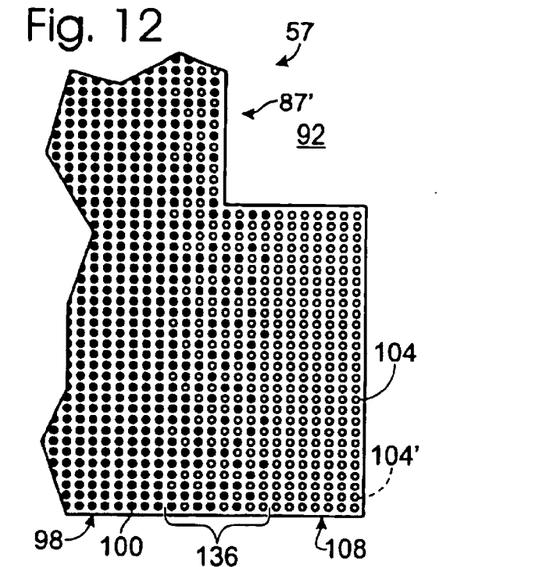
FIG. 12 is a schematic microscopic view of a portion of a clad bipolar plate assembly constructed according to the present invention taken along the line 11–12 in FIG. 5.

It is within the scope of the invention, however, that the structural and conductive layer(s) may be secured together by a cladding process, in which case the transition region extends within both the structural and the conductive layers as a result of the cladding process, which causes intermetallic diffusion between the structural metal and the conductive metal(s). This intermetallic diffusion is schematically illustrated in FIG. 12, in which the comingling of the black and white dots schematically illustrates the intermetallic diffusion that has occurred between the metals, or layers, during the cladding process. In contrast, compare FIG. 11, in which there is no diffusion, or comingling, of the metals. As a clarification, and as used herein, "cladding" is meant to refer to processes by which two metals are secured together through a process that results in intermetallic diffusion of the metals, typically with an overall reduction in thickness of the unclad layers. Securing the conductive and structural layers together by cladding may also be referred to as diffusion bonding the layers together. Non-exclusive examples of suitable cladding processes include roll cladding and explosive cladding. When bipolar plate assembly 57 includes a structural layer 98 to which conductive layers 102 and 108 are clad, the conductive layers may be clad using the same or different mechanisms.

A benefit of a cladding process is that it increases the electrical conductivity between the structural and conductive layers when either of the layers is formed from a metal that tends to oxidize and thereby form a surface oxide layer. For example, if structural layer 98 is made of titanium, a metal that forms a surface oxide layer that decreases the overall electrical conductivity of structural layer 98, intermetallically diffusing the titanium structural layer with a conductive layer exposes virgin titanium metal to the conductive metal, thereby decreasing the effect of the titanium's surface oxide layer. Cladding the metals also may increase electrical conductivity even if no surface oxide layer is present. The intermetallically diffused metals are more intimately connected, and are better suited for conducting electricity than unclad, or unfused, metals. Increasing the conductivity between the structural metal and the conductive metal is useful because the structural metal typically has a relatively high strength-to-weight ratio compared to the conductive metal, and the conductive metal typically has a more favorable electrical contact resistance compared to the structural metal. When clad together, the resulting bipolar plate assembly enjoys the favorable strength and weight characteristics of the structural metal, while simultaneously enjoying the favorable contact conductivity of the conductive metal and the lowered resistance between the structural and conductive metals. In particular, when titanium and stainless steel are used, the bipolar plate assembly has strength-to-weight characteristics of titanium and electrical conductivity characteristics of stainless steel without suffering greatly from the comparatively low strength-to-weight ratio of stainless steel or the comparatively lower electrical conductivity of titanium, namely, titanium that has a surface oxide layer.

Figure 13:
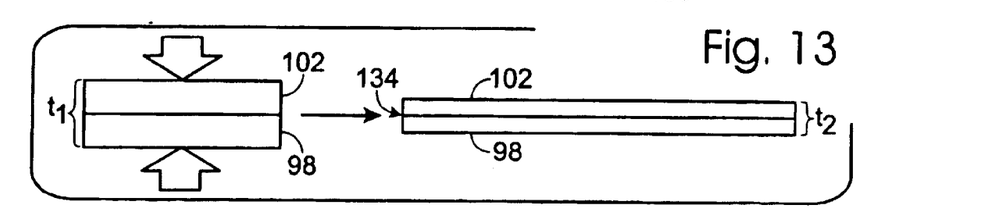
FIG. 13 is a schematic view demonstrating a method of forming a portion of a bipolar plate assembly by cladding a conductive layer to a structural layer.
Figure 14:
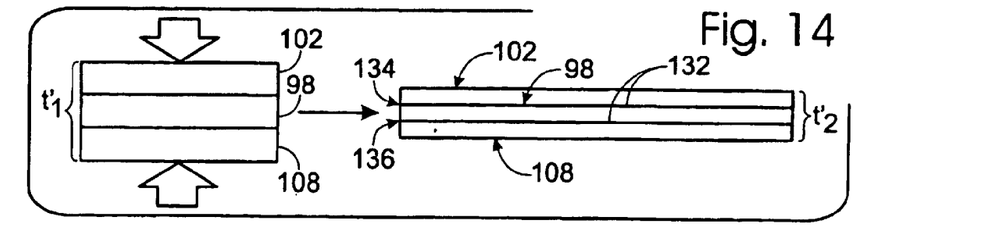
FIG. 14 is a schematic view demonstrating a method of forming a portion of a bipolar plate assembly by cladding two conductive layers to opposite faces of a structural layer.

FIG. 13 shows a schematic representation of a cladding process in which conductive layer 102 and structural layer 98 are clad, or intermetallically diffused, together. Before cladding, conductive layer 102 and structural layer 98 have a collective thickness $t_1$. After cladding, conductive layer 102 and structural layer 98 have a collective thickness $t_2$, which is less than $t_1$. This contrasts other methods of joining the layers such as via plating, welding, an adhesive, or physical abutment, in which case $t_2$ may actually be greater than $t_1$. FIG. 14 graphically depicts a cladding process in which conductive layers 102 and 108 are clad on opposite faces 132 of structural layer 98. Although structural and conductive layers 98, 102 and 108 have been illustrated in FIGS. 13 and 14 (and elsewhere herein) as having the same individual thicknesses, it is within the scope of the invention that the individual thicknesses of these layers may vary.

Figure 15:
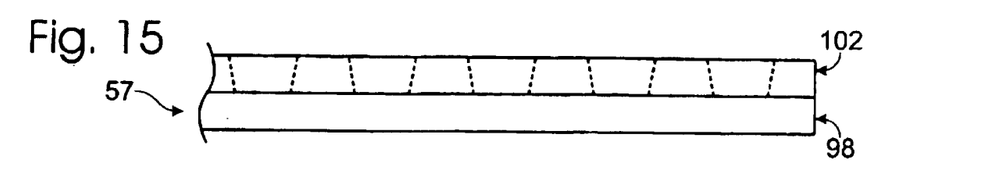
FIG. 15 is a schematic fragmentary view of a portion of a bipolar plate assembly before a flow field has been etched into the bipolar plate assembly.
Figure 16:
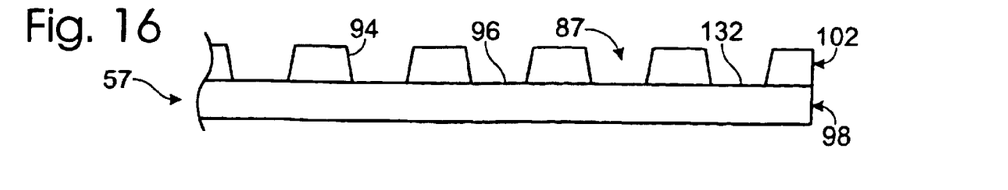
FIG. 16 is a schematic view of a portion of a bipolar plate assembly after a flow field has been etched into a conductive layer of the bipolar plate assembly.

FIGS. 15 and 16 schematically depict a portion of bipolar plate assembly 57 before and after a flow field 87 has been established. The following discussion refers to flow field 87 in conductive layer 102, but it should be understood that it also applies to a flow field in conductive layer 108, such as in embodiments of assembly 57 that include conductive layers clad onto opposing faces of the structural layer. When the structural and conductive layers are clad together, the flow field(s) is(are) typically created in the resulting bipolar plate assembly after the layers are clad together. However, in some embodiments of the invention, such as embodiments in which the layers are not clad together, the flow fields may be created prior to joining the layers together.

Regardless of whether the bipolar plate assembly includes clad or unclad layers, an example of a suitable method for creating flow fields 87 is to sacrificially etch conductive layer 102. Sacrificial etching is typically performed by positioning an etching mask on the conductive layer and exposing the conductive layer to an etchant configured to react with the conductive layer. The reaction causes conductive metal that is not shielded by the etching mask to become disassociated from the remaining conductive layer. In this manner, the mask controls what portions of the conductive layer are etched. The etchant may be sprayed or otherwise applied against the conductive layer and mask so that the conductive layer is exposed to fresh etchant as the reaction takes place. The reaction with the conductive layer may be facilitated by heating the etchant. It should be understood that varying the concentration and composition of the etchant and/or the amount of time the conductive layer is exposed to the etchant will affect the amount of the conductive layer (and in some embodiments, the structural layer) that is removed. For example, the conductive layer may pass on a conveyor under nozzles adapted to spray etchant, and the size of the flow field channels resulting from the etchant spray may be controlled by adjusting the speed of the conveyor.

Because the structural and conductive layers are formed from different materials, it is within the scope of the invention that an etchant may be used that will react with and thereby remove the conductive layer while being at least substantially, if not completely, unreactive with the structural layer. A benefit of such a construction and process is that the maximum depth of the flow fields is predetermined by the thickness of the conductive layer. Therefore, in such an embodiment, flow field(s) can be etched to a uniform depth without having to precisely control the concentration and exposure time of the etchant; at least not to the degree necessary when the bipolar plate assembly is formed from a single metal or a generally uniform mixture of metals. In this latter scenario, even careful control of these variables still makes it very difficult, if not impossible, to initially obtain uniform flow field depths or other dimensions. For example, as the etchant removes material from the bipolar plate assembly, the concentration of the etchant decreases. Similarly, the temperature of the etchant and the corresponding region of the bipolar plate assembly tends to increase during the etching process, as this is an exothermic process and this change in temperature may affect the rate at which metal is removed and/or the shape of the resulting flow field.

Returning to the selective etching discussed above, the etchant may sacrificially etch all the way through the conductive layer, such as layers 102 or 108, in a pattern controlled by the etching mask. However, because the etchant is unreactive with structural layer 98, the depth of the flow field is limited to the depth of the conductive layer. Therefore, the depth of the flow field is set to equal the depth of the conductive layer. Aqueous ferric chloride has proven to be a suitable etchant when the conductive layer is made of stainless steel and the structural layer is made of titanium. Ferric chloride will etch through stainless steel while leaving titanium unetched or at most substantially unetched. As used herein, "unetched" is meant to include no removal of metal from the structural layer, and de minimis removal, such as removal of essentially only a surface oxide layer, while "substantially unetched" is meant to refer to a comparatively smaller removal of metal from the structural layer than would comparatively be removed from a conductive layer. For example, an etchant that removes approximately 90% less material from structural metal 100 than conductive metal 104 or 104' during the same time period may be described as a suitable etchant that will form a flow field in the bipolar plate assembly by removing the conductive layer and leaving the structural layer substantially unetched.

It is within the scope of the invention to use etchants other than ferric chloride, especially when the conductive layer is not stainless steel and/or the structural layer is not titanium. In contrast, ferric chloride will dissolve completely through a bipolar plate assembly formed completely from stainless steel or aluminum unless the application of the etchant is controlled. Similarly, a bipolar plate assembly that is completely formed from titanium requires an etchant, such as hydrofluoric acid (HF), which is very toxic and therefore increases the cost, equipment and/or potential risk of employing sacrificial etching to form the flow fields.

Figure 17:
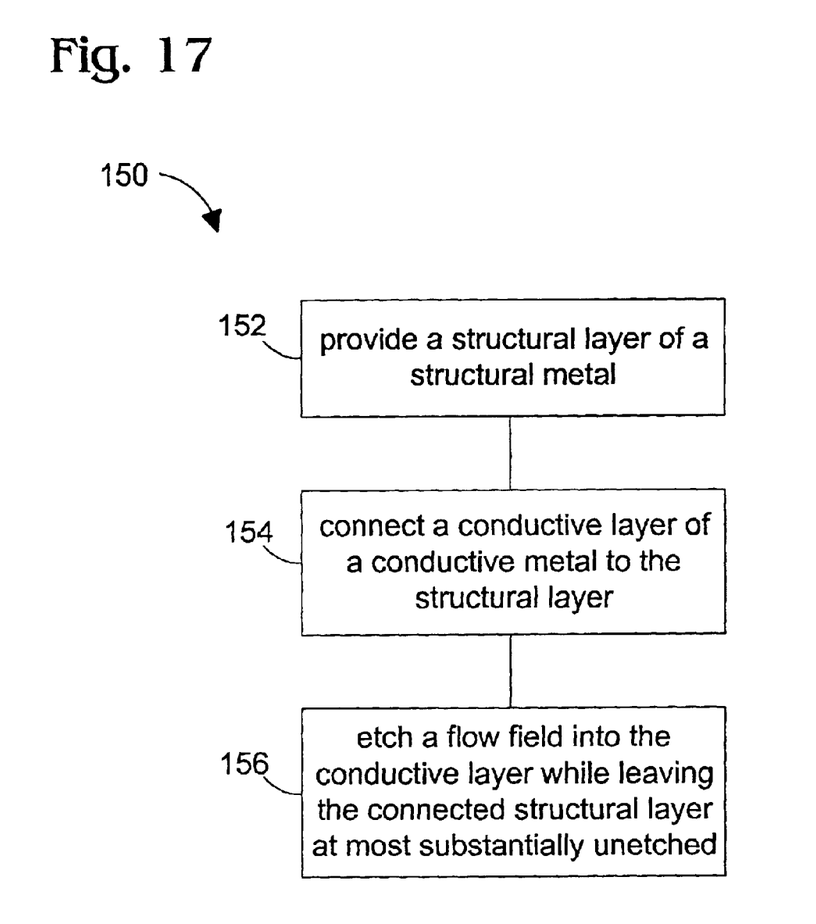
FIG. 17 shows a method of constructing a bipolar plate assembly.

FIG. 17 shows, generally at 150, a method of constructing a bipolar plate assembly for use in a fuel cell stack. Method 150 includes, at 152, providing a structural layer of a structural metal, such as structural layer 98 of structural metal 100. As described above, the structural layer typically is between 0.01 and 0.1 inches thick, although thicker or thinner layers may be used. The structural metal is usually selected from metals with a high strength-to-weight ratio, such as titanium, vanadium, and/or their alloys.

The method further includes, at 154, connecting a conductive layer of a conductive metal to the structural layer. The conductive layer is typically between 0.01 inches and 0.1 inches thick, although thicker or thinner layers may be used. The conductive metal may be selected from metals with a low electrical contact resistance, such as conventional stainless steels. In some embodiments, the connecting step includes diffusion bonding the layers through a cladding process in which the metals forming the layers are intermetallically diffused. It should be understood that the connecting step may, but does not necessarily, include connecting a second conductive layer to the structural layer, either at the same or a different time as the first conductive layer.

The method further includes, at 156, etching a flow field into the conductive layer (or the conductive layers, and either at the same time or at different times) while leaving the connected structural layer at most substantially unetched. As described above, a flow field may be established by sacrificially etching the conductive layer with an etchant configured to react with the conductive layer. The structural layer may be left unetched or at most substantially unetched by selecting an etchant that does not easily react with the structural layer. In this way, the structural layer is left at most substantially unetched, even when a flow field is etched all the way though the conductive layer. As discussed, when the conductive metal is stainless steel and the structural metal is titanium, ferric chloride may be used as an etchant.

Figure 18:
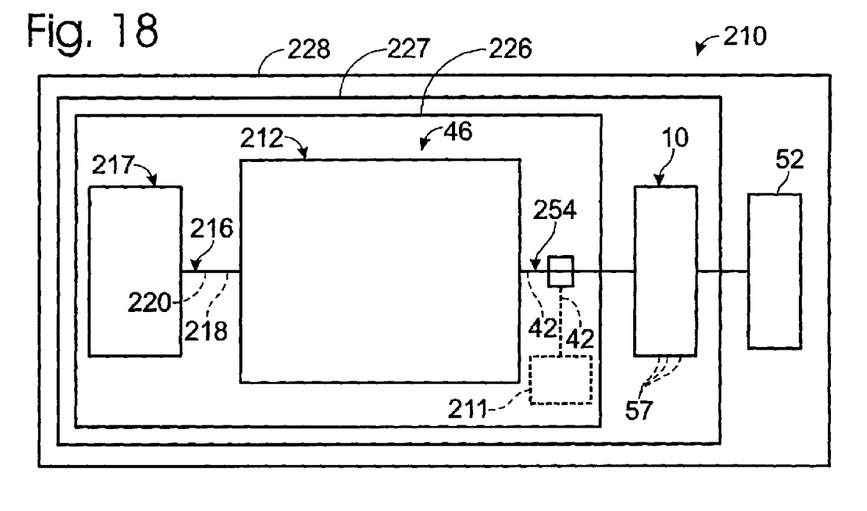
FIG. 18 is a schematic view of a fuel cell system that includes a fuel cell stack with bipolar plate assemblies according to the present invention.

As discussed above, some fuel cell stacks utilize hydrogen gas as a reactant, or fuel. Therefore, a fuel cell stack 10 according to the present invention may be coupled with a source 46 of hydrogen gas 42 (related delivery systems and balance of plant components) to form a fuel cell system. A fuel cell system according to the present invention is shown in FIG. 18 and generally indicated at 210. As discussed previously with respect to FIG. 2, examples of sources 46 of hydrogen gas 42 include a storage device 211 that contains a stored supply of hydrogen gas, as indicated in dashed lines in FIG. 18. Examples of suitable storage devices 211 include pressurized tanks and hydride beds. An additional or alternative source 46 of hydrogen gas 42 is the product stream from a fuel processor, which produces hydrogen by reacting a feed stream to produce reaction products from which the stream containing hydrogen gas 42 is formed. As shown in solid lines in FIG. 18, system 210 includes at least one fuel processor 212 and at least one fuel cell stack 10. Fuel processor 212 is adapted to produce a product hydrogen stream 254 containing hydrogen gas 42 from a feed stream 216 containing at least one feedstock. The fuel cell stack is adapted to produce an electric current from the portion of product hydrogen stream 254 delivered thereto. In the illustrated embodiment, a single fuel processor 212 and a single fuel cell stack 10 are shown; however, it is within the scope of the invention that more than one of either or both of these components may be used. It should be understood that these components have been schematically illustrated and that the fuel cell system may include additional components that are not specifically illustrated in the figures, such as air delivery systems, heat exchangers, heating assemblies and the like. As also shown, hydrogen gas may be delivered to stack 10 from one or more of fuel processor 212 and storage device 211, and hydrogen from the fuel processor may be delivered to one or more of the storage device and stack 10. Some or all of stream 254 may additionally, or alternatively, be delivered, via a suitable conduit, for use in another hydrogen-consuming process, burned for fuel or heat, or stored for later use.

Fuel processor 212 is any suitable device that produces hydrogen gas from the feed stream. Examples of suitable mechanisms for producing hydrogen gas from feed stream 216 include steam reforming and autothermal reforming, in which reforming catalysts are used to produce hydrogen gas from a feed stream containing a carbon-containing feedstock and water. Other suitable mechanisms for producing hydrogen gas include pyrolysis and catalytic partial oxidation of a carbon-containing feedstock, in which case the feed stream does not contain water. Still another suitable mechanism for producing hydrogen gas is electrolysis, in which case the feedstock is water. Examples of suitable carbon-containing feedstocks include at least one hydrocarbon or alcohol. Examples of suitable hydrocarbons include methane, propane, natural gas, diesel, kerosene, gasoline and the like. Examples of suitable alcohols include methanol, ethanol, and polyols, such as ethylene glycol and propylene glycol.

Figure 19:
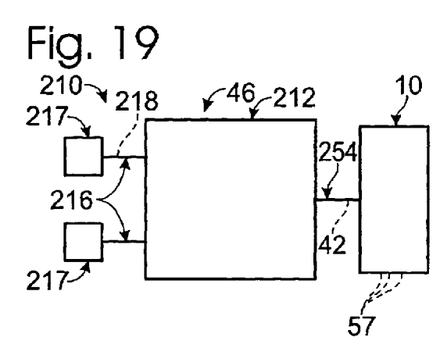
FIG. 19 is a schematic view of another fuel cell system that includes a fuel cell stack with bipolar plate assemblies according to the present invention.

Feed stream 216 may be delivered to fuel processor 212 via any suitable mechanism. Although only a single feed stream 216 is shown in FIG. 18, it should be understood that more than one stream 216 may be used and that these streams may contain the same or different feedstocks. When carbon-containing feedstock 218 is miscible with water, the feedstock is typically, but not required to be, delivered with the water component of feed stream 216, such as shown in FIG. 18. When the carbon-containing feedstock is immiscible or only slightly miscible with water, these feedstocks are typically delivered to fuel processor 212 in separate streams, such as shown in FIG. 19. In FIGS. 18 and 19, feed stream 216 is shown being delivered to fuel processor 212 by a feedstock delivery system 217, which will be discussed in more detail subsequently.

In many applications, it is desirable for the fuel processor to produce at least substantially pure hydrogen gas. Accordingly, the fuel processor may utilize a process that inherently produces sufficiently pure hydrogen gas, or the fuel processor may include suitable purification and/or separation devices that remove impurities from the hydrogen gas produced in the fuel processor. As another example, the fuel processing system or fuel cell system may include purification and/or separation devices downstream from the fuel processor. In the context of a fuel cell system, the fuel processor preferably is adapted to produce substantially pure hydrogen gas, and even more preferably, the fuel processor is adapted to produce pure hydrogen gas. For the purpose of the present invention, substantially pure hydrogen gas is greater than 90% pure, preferably greater than 95% pure, more preferably greater than 99% pure, and even more preferably greater than 99.5% pure. Suitable fuel processors are disclosed in U.S. Pat. Nos. 6,221,117, 5,997,594, 5,861,137, and pending U.S. patent application Ser. No. 09/802,361. The complete disclosures of the above-identified patents and patent application are hereby incorporated by reference for all purposes.

Figure 20:
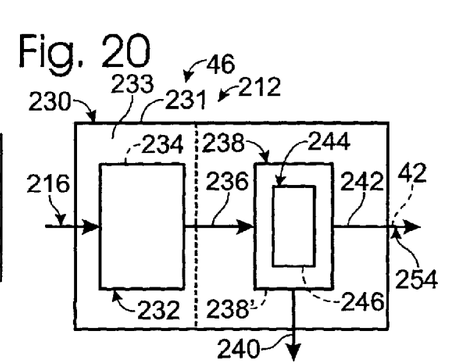
FIG. 20 is a schematic view of a fuel processor that may be used with fuel cell systems according to the present invention.

For purposes of illustration, the following discussion will describe fuel processor 212 as a steam reformer adapted to receive a feed stream 216 containing a carbon-containing feedstock 218 and water 220. However, it is within the scope of the invention that fuel processor 212 may take other forms, as discussed above. An example of a suitable steam reformer is shown in FIG. 20 and indicated generally at 230. Reformer 230 includes a reforming, or hydrogen-producing, region 232 that includes a steam reforming catalyst 234. Alternatively, reformer 230 may be an autothermal reformer that includes an autothermal reforming catalyst. In reforming region 232, a reformate stream 236 is produced from the water and carbon-containing feedstock in feed stream 216. The reformate stream typically contains hydrogen gas and other gases. In the context of a fuel processor generally, a mixed gas stream that contains hydrogen gas and other gases is produced from the feed stream. The mixed gas, or reformate, stream is delivered to a separation region, or purification region, 238, where the hydrogen gas is purified. In separation region 238, the hydrogen-containing stream is separated into one or more byproduct streams, which are collectively illustrated at 240 and which typically include at least a substantial portion of the other gases, and a hydrogen-rich stream 242, which contains at least substantially pure hydrogen gas. The separation region may utilize any separation process, including a pressure-driven separation process. In FIG. 20, hydrogen-rich stream 242 is shown forming product hydrogen stream 254.

An example of a suitable structure for use in separation region 238 is a membrane module 244, which contains one or more hydrogen permeable membranes 246. Examples of suitable membrane modules formed from a plurality of hydrogen-selective metal membranes are disclosed in U.S. Pat. No. 6,319,306, the complete disclosure of which is hereby incorporated by reference for all purposes. In the '306 patent, a plurality of generally planar membranes are assembled together into a membrane module having flow channels through which an impure gas stream is delivered to the membranes, a purified gas stream is harvested from the membranes and a byproduct stream is removed from the membranes. Gaskets, such as flexible graphite gaskets, are used to achieve seals around the feed and permeate flow channels. Also disclosed in the above-identified application are tubular hydrogen-selective membranes, which also may be used. Other suitable membranes and membrane modules are disclosed in the above-incorporated patents and applications, as well as U.S. patent application Ser. Nos. 10/067,275 and 10/027,509, the complete disclosures of which are hereby incorporated by reference in their entirety for all purposes. Membrane(s) 246 may also be integrated directly into the hydrogen-producing region or other portion of fuel processor 212.

The thin, planar, hydrogen-permeable membranes are preferably composed of palladium alloys, most especially palladium with 35 wt % to 45 wt % copper, such as approximately 40 wt % copper. These membranes, which also may be referred to as hydrogen-selective membranes, are typically formed from a thin foil that is approximately 0.001 inches thick. It is within the scope of the present invention, however, that the membranes may be formed from hydrogen-selective metals and metal alloys other than those discussed above, hydrogen-permeable and selective ceramics, or carbon compositions. The membranes may have thicknesses that are larger or smaller than discussed above. For example, the membrane may be made thinner, with commensurate increase in hydrogen flux. The hydrogen-permeable membranes may be arranged in any suitable configuration, such as arranged in pairs around a common permeate channel as is disclosed in the incorporated patent applications. The hydrogen permeable membrane or membranes may take other configurations as well, such as tubular configurations, which are disclosed in the incorporated patents.

Another example of a suitable pressure-separation process for use in separation region 238 is pressure swing adsorption (PSA). In a pressure swing adsorption (PSA) process, gaseous impurities are removed from a stream containing hydrogen gas. PSA is based on the principle that certain gases, under the proper conditions of temperature and pressure, will be adsorbed onto an adsorbent material more strongly than other gases. Typically, it is the impurities that are adsorbed and thus removed from reformate stream 236. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent material. Impurity gases such as $NH_3$, $H_2S$, and $H_2O$ adsorb very strongly on the adsorbent material and are therefore removed from stream 236 along with other impurities. If the adsorbent material is going to be regenerated and these impurities are present in stream 236, separation region 238 preferably includes a suitable device that is adapted to remove these impurities prior to delivery of stream 236 to the adsorbent material because it is more difficult to desorb these impurities.

Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å (5 angstrom) zeolites. The adsorbent material is commonly in the form of pellets and it is placed in a cylindrical pressure vessel utilizing a conventional packed-bed configuration. It should be understood, however, that other suitable adsorbent material compositions, forms and configurations may be used.

As discussed, it is also within the scope of the invention that at least some of the purification of the hydrogen gas is performed intermediate the fuel processor and the fuel cell stack. Such a construction is schematically illustrated in dashed lines in FIG. 20, in which the separation region 238' is depicted downstream from the shell 231 of the fuel processor.

Figure 21:
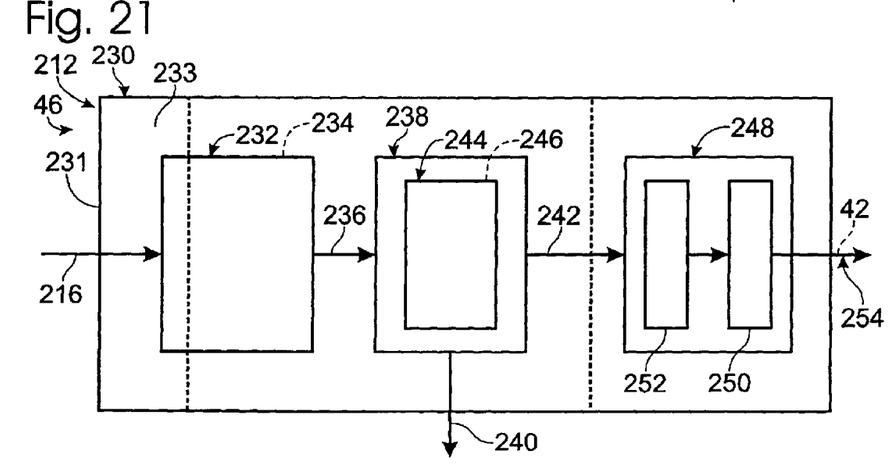
FIG. 21 is a schematic view of another fuel processor that may be used with fuel cell systems according to the present invention.

Reformer 230 may, but does not necessarily, additionally or alternatively, include a polishing region 248, such as shown in FIG. 21. As shown, polishing region 248 receives hydrogen-rich stream 242 from separation region 238 and further purifies the stream by reducing the concentration of, or removing, selected compositions therein. For example, when stream 242 is intended for use in a fuel cell stack, such as stack 10, compositions that may damage the fuel cell stack, such as carbon monoxide and carbon dioxide, may be removed from the hydrogen-rich stream. The concentration of carbon monoxide should be less than 10 ppm (parts per million). Preferably, the system limits the concentration of carbon monoxide to less than 5 ppm, and even more preferably, to less than 1 ppm. The concentration of carbon dioxide may be greater than that of carbon monoxide. For example, concentrations of less than 25% carbon dioxide may be acceptable. Preferably, the concentration is less than 10%, and even more preferably, less than 1%. Especially preferred concentrations are less than 50 ppm. It should be understood that the acceptable maximum concentrations presented herein are illustrative examples, and that concentrations other than those presented herein may be used and are within the scope of the present invention. For example, particular users or manufacturers may require minimum or maximum concentration levels or ranges that are different than those identified herein. Similarly, when fuel processor 212 is not used with a fuel cell stack, or when it is used with a fuel cell stack that is more tolerant of these impurities, then the product hydrogen stream may contain larger amounts of these gases.

Region 248 includes any suitable structure for removing or reducing the concentration of the selected compositions in stream 242. For example, when the product stream is intended for use in a PEM fuel cell stack or other device that will be damaged if the stream contains more than determined concentrations of carbon monoxide or carbon dioxide, it may be desirable to include at least one methanation catalyst bed 250. Bed 250 converts carbon monoxide and carbon dioxide into methane and water, both of which will not damage a PEM fuel cell stack. Polishing region 248 may also include another hydrogen-producing device 252, such as another reforming catalyst bed, to convert any unreacted feedstock into hydrogen gas. In such an embodiment, it is preferable that the second reforming catalyst bed is upstream from the methanation catalyst bed so as not to reintroduce carbon dioxide or carbon monoxide downstream of the methanation catalyst bed.

Steam reformers typically operate at temperatures in the range of 200° C. and 700° C., and at pressures in the range of 50 psi and 1000 psi, although temperatures and pressures outside of these ranges are within the scope of the invention, such as depending upon the particular type and configuration of fuel processor being used. Any suitable heating mechanism or device may be used to provide this heat, such as a heater, burner, combustion catalyst, or the like. The heating assembly may be external the fuel processor or may form a combustion chamber that forms part of the fuel processor. The fuel for the heating assembly may be provided by the fuel processing system, by the fuel cell system, by an external source or any combination thereof.

In FIGS. 20 and 21, reformer 230 is shown including a shell 231 in which the above-described components are contained. Shell 231, which also may be referred to as a housing, enables the fuel processor, such as reformer 230, to be moved as a unit. It also protects the components of the fuel processor from damage by providing a protective enclosure and reduces the heating demand of the fuel processor because the components of the fuel processor may be heated as a unit. Shell 231 may, but does not necessarily, include insulating material 233, such as a solid insulating material, blanket insulating material, or an air-filled cavity. It is within the scope of the invention, however, that the reformer may be formed without a housing or shell. When reformer 230 includes insulating material 233, the insulating material may be internal the shell, external the shell, or both. When the insulating material is external a shell containing the above-described reforming, separation and/or polishing regions, the fuel processor may further include an outer cover or jacket external the insulation.

It is further within the scope of the invention that one or more of the components may either extend beyond the shell or be located external at least shell 231. For example, and as schematically illustrated in FIG. 21, polishing region 248 may be external shell 231 and/or a portion of reforming region 232 may extend beyond the shell. Other examples of fuel processors demonstrating these configurations are illustrated in the incorporated references and discussed in more detail herein.

Although fuel processor 212, feedstock delivery system 217, fuel cell stack 10 and energy-consuming device 52 may all be formed from one or more discrete components, it is also within the scope of the invention that two or more of these devices may be integrated, combined or otherwise assembled within an external housing or body. For example, a fuel processor and feedstock delivery system may be combined to provide a hydrogen-producing device with an on-board, or integrated, feedstock delivery system, such as schematically illustrated at 226 in FIG. 18. Similarly, a fuel cell stack may be added to provide an energy-generating device with an integrated feedstock delivery system, such as schematically illustrated at 227 in FIG. 18.

Fuel cell system 210 may additionally be combined with an energy-consuming device, such as device 52, to provide the device with an integrated, or on-board, energy source. For example, the body of such a device is schematically illustrated in FIG. 18 at 228. Examples of such devices include a motor vehicle, such as a recreational vehicle, automobile, boat or other seacraft, and the like, a dwelling, such as a house, apartment, duplex, apartment complex, office, store or the like, or self-contained equipment, such as an appliance, light, tool, microwave relay station, transmitting assembly, remote signaling or communication equipment, etc.

INDUSTRIAL APPLICABILITY

The invented bipolar plate assemblies, methods for forming the same, and fuel cells and fuel cell stacks containing the same are applicable to the fuel processing, fuel cell and other industries in which fuel cells are utilized.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A fuel cell stack, comprising:
   a pair of end plates;
   a plurality of membrane-electrode assemblies arranged in series between the pair of end plates; and
   a bipolar plate assembly operatively interposed between adjacently situated membrane-electrode assemblies, wherein the bipolar plate assembly includes a structural layer of a structural metal, a conductive layer of a conductive metal intermetallically diffused to the structural layer, and a flow field at least partially defined by the conductive layer, wherein the structural metal and the conductive metal have different compositions, wherein the structural metal has a higher strength-to-weight ratio than the conductive metal, wherein the conductive layer includes opposed first and second faces, wherein the first face is intermetallically diffused to the structural layer where the first face abuts the structural layer, and further wherein the flow field extends from an opening in the second face toward the first face and comprises of at least one channel from which the conductive metal has been removed to define laterally spaced sidewalls and a bottom.

2. The fuel cell stack of claim 1, wherein the structural metal includes titanium.

3. The fuel cell stack of claim 1, wherein the conductive metal includes stainless steel.

4. The fuel cell stack of claim 1, wherein the structural metal includes titanium, and the conductive metal includes stainless steel.

5. The fuel cell stack of claim 1, wherein the bipolar plate assembly is configured to conduct electrical charge from one of the membrane-electrode assemblies to another of the membrane-electrode assemblies.

6. The fuel cell stack of claim 1, wherein the flow field includes a sacrificially etched flow field channel.

7. The fuel cell stack of claim 6, wherein the flow field channel extends into the conductive layer.

8. The fuel cell stack of claim 7, wherein the flow field channel extends through the conductive layer and includes a bottom defined at least partially by the structural layer.

9. The fuel cell stack of claim 6, wherein the conductive layer has a thickness and the flow field has a depth that is equal to the thickness of the conductive layer.

10. The fuel cell stack of claim 1, wherein the conductive metal has a lower electrical contact resistance than the structural metal.

11. The fuel cell stack of claim 1, wherein the conductive layer is a first conductive layer, and the bipolar plate assembly further includes a second conductive layer of the conductive metal intermetallically diffused to the structural layer opposite the first conductive layer.

12. The fuel cell stack of claim 11 wherein the bipolar plate assembly further includes a second flow field at least partially defined by the second conductive layer.

13. The fuel cell stack of claim 1, in combination with a source of hydrogen gas adapted to deliver a stream of hydrogen gas to the fuel cell stack.

14. The fuel cell stack of claim 13 wherein the source includes a fuel processor adapted to produce the stream of hydrogen gas from a feed stream.

15. The fuel cell stack of claim 14 wherein the feed stream includes water and a carbon-containing feedstock.

16. The fuel cell stack of claim 15 wherein the fuel processor includes a reforming region adapted to produce a mixed gas stream containing hydrogen gas and other gases from the feed stream, and further wherein the stream of hydrogen gas is formed from the mixed gas stream.

17. The fuel cell stack of claim 16, wherein the fuel processor further includes a separation region that contains at least one hydrogen-selective membrane adapted to separate the mixed gas stream into a hydrogen-rich stream containing at least substantially pure hydrogen gas and a byproduct stream containing at least a substantial portion of the other gases.

18. The fuel cell stack of claim 1, wherein the bipolar plate assembly is free from a surface oxide layer between the first face of the conductive layer and the structural layer.

19. The fuel cell stack of claim 1, wherein the conductive layer is not permeable to hydrogen gas or water other than through the flow field.

20. The fuel cell stack of claim 8, wherein the flow field channel extends into the structural layer.

21. A fuel cell stack, comprising:
a pair of end plates;
a plurality of membrane-electrode assemblies arranged between the pair of end plates; and
a bipolar plate assembly operatively interposed between adjacently situated membrane-electrode assemblies, wherein the bipolar plate assembly comprises:
a structural core of a structural metal, wherein the structural metal includes at least one of titanium, vanadium, and alloys thereof,
an anode interfacing layer of a conductive metal joining the structural core at a first transitional region extending across the anode interfacing layer, the first transitional region consisting essentially of intermetallically diffused structural and conductive metals, and
a cathode interfacing layer of the conductive metal joining the structural core at a second transitional region extending across the cathode interfacing layer, the second transitional region consisting essentially of intermetallically diffused structural and conductive metals, wherein the structural metal and the conductive metal have different compositions, wherein the structural metal has a higher strength-to-weight ratio than the conductive metal, and the conductive metal has a lower electrical contact resistance than the structural metal.

22. The fuel cell stack of claim 21, wherein the structural metal includes titanium, and the conductive metal includes stainless steel.

23. The fuel cell stack of claim 21 wherein the bipolar plate assembly further includes an anode flow field at least partially defined by the anode interfacing layer.

24. The fuel cell stack of claim 23 wherein the anode flow field extends into the anode interfacing layer.

25. The fuel cell stack of claim 24, wherein the anode flow field extends through the anode interfacing layer and includes a bottom defined at least partially by the structural core.

26. The fuel cell stack of claim 21 wherein the bipolar plate assembly further includes a cathode flow field at least partially defined by the cathode interfacing layer.

27. The fuel cell stack of claim 26 wherein the cathode flow field extends into the cathode interfacing layer.

28. The fuel cell stack of claim 27 wherein the cathode flow field extends through the cathode interfacing layer and includes a bottom defined at least partially by the structural core.

29. The fuel cell stack of claim 21 wherein a portion of the structural core is located on an anode-side plate, and another portion is located on a cathode-side plate, and wherein a conduit is located between the anode-side plate and the cathode-side plate.

30. The fuel cell stack of claim 25, wherein the anode flow field extends into the structural core.

31. The fuel cell stack of claim 23 wherein the anode flow field includes at least one sacrificially etched channel.

32. The fuel cell stack of claim 23 wherein the anode flow field comprises channels having a bottom extending toward the cathode interfacing layer, generally opposed sidewalls and an opening opposite the bottom.

33. The fuel cell stack of claim 28 wherein the cathode flow field extends into the structural core.

34. The fuel cell stack of claim 26, wherein the cathode flow field includes at least one sacrificially etched channel.

35. The fuel cell stack of claim 26, wherein the cathode flow field comprises channels having a bottom extending toward the anode interfacing layer, generally opposed sidewalls and an opening opposite the bottom.

36. The fuel cell stack of claim 21 wherein the anode interfacing layer is not permeable to hydrogen gas.

37. The fuel cell stack of claim 21 wherein the cathode interfacing layer not permeable to water.

38. The fuel cell stack of claim 21, wherein the first transitional region is free from a surface oxide layer between the anode interfacing layer and the structural core.

39. The fuel cell stack of claim 21 wherein the second transitional region is free from a surface oxide layer between the cathode interfacing layer and the structural core.

* * * * *